United States Patent [19]
Lucas

[11] 3,899,074
[45] Aug. 12, 1975

[54] BRAZING WASHER CHAIN
[75] Inventor: William F. Lucas, Oak Creek, Wis.
[73] Assignee: Lucas-Milhaupt, Inc., Cudahy, Wis.
[22] Filed: July 1, 1974
[21] Appl. No.: 484,548

[52] U.S. Cl.............. 206/343; 85/50 R; 151/35; 206/330; 206/820
[51] Int. Cl.$^2$.................. B65D 73/02; F16B 39/28
[58] Field of Search .......... 206/303, 330, 343, 344, 206/390, 820; 85/50 R, 17; 151/35

[56] References Cited
UNITED STATES PATENTS

| | | | |
|---|---|---|---|
| 2,716,247 | 8/1955 | Poupitch | 151/35 |
| 3,137,858 | 6/1964 | Powers | 206/344 |
| 3,270,874 | 9/1966 | Hilton | 206/343 |
| 3,285,313 | 11/1966 | Blakesley | 151/35 |

Primary Examiner—William I. Price
Assistant Examiner—Bruce H. Bernstein
Attorney, Agent, or Firm—James E. Nilles

[57] ABSTRACT

A chain of flat brazing washers which are fed to a workpiece, a washer being severed from the chain and dropped into an aperture or opening in the workpiece, all being done at a rapid rate. The chain has a notch at each of its sides and at the juncture between the overlapped periphery of the washers. In other words, the washers are formed of flat stock so that their adjacent portions merge or overlap. The notches which extend into the overlap area from each side permit the washers to be severed from one another so that no portion of a severed washer extends beyond its periphery, that is to say there are no projections extending beyond the washer which would prevent it from dropping into a correspondingly shaped opening.

2 Claims, 5 Drawing Figures

PATENTED AUG 12 1975　　3,899,074
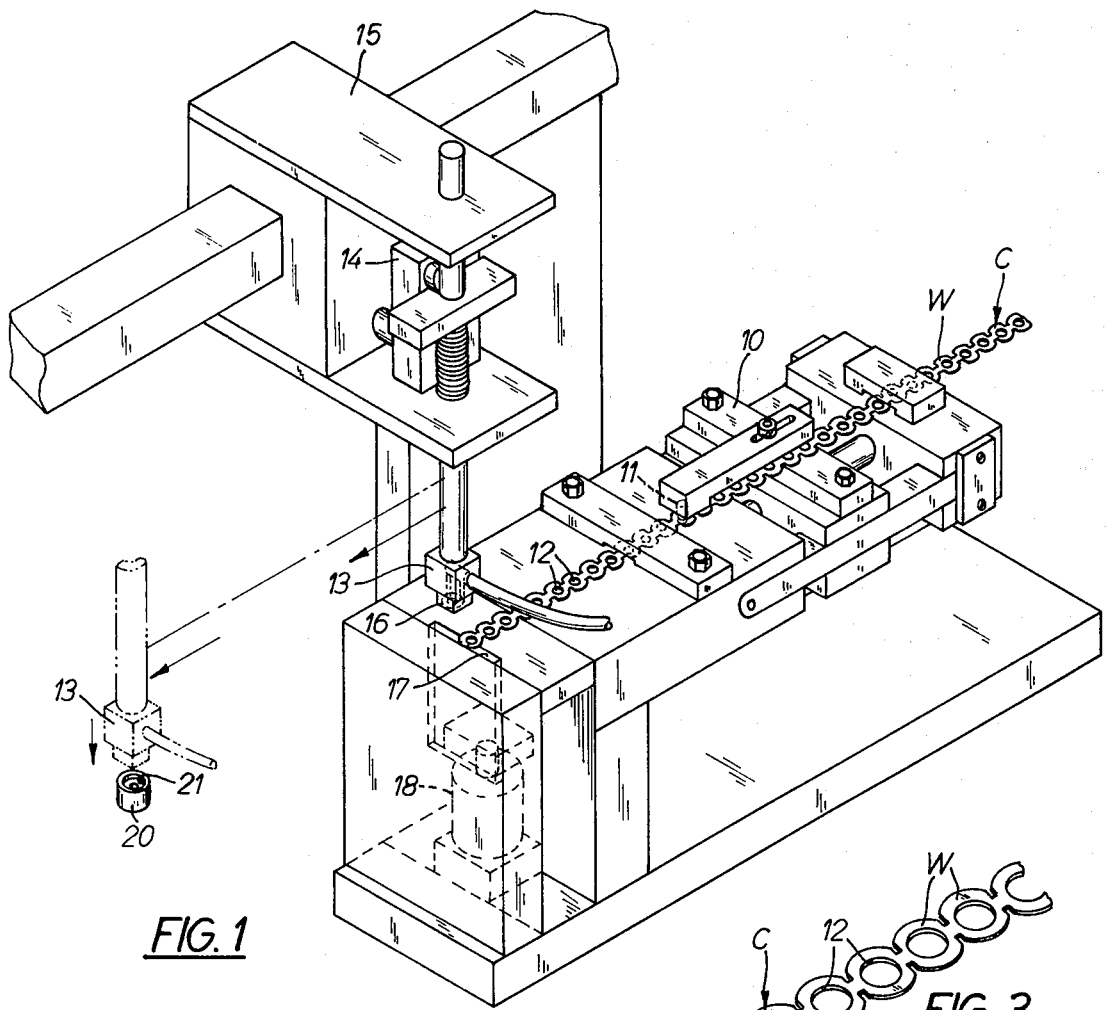
FIG.1
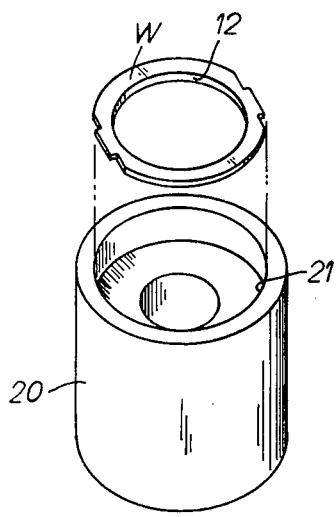
FIG.2
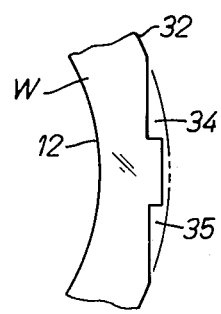
FIG.5
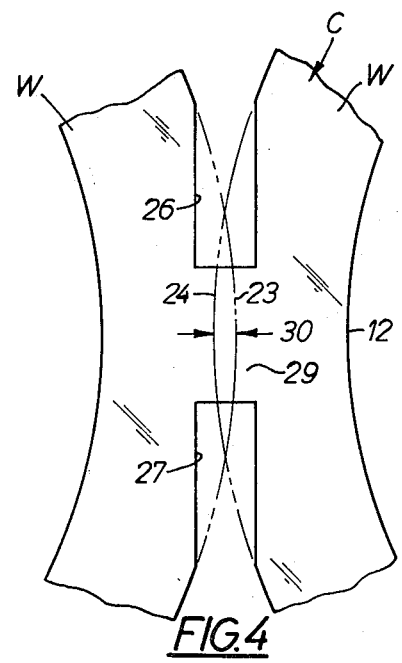
FIG.3
FIG.4

3,899,074

BRAZING WASHER CHAIN

BACKGROUND OF THE INVENTION

Chains of brazing washers are known and are fed, usually by automatic equipment, into an opening or recess in a workpiece. The washer which is severed from the chain must fit within the opening or malfunction of the machine will occur. Heretofore, the prior art brazing washer chains have not always severed the washer from the chain in an accurate manner so that a protrusion extended beyond the periphery of the washer and prevented it from dropping readily into its assigned hole in the workpiece.

SUMMARY OF THE INVENTION

The present invention provides a flat brazing washer chain comprising a plurality of flat washers integrally formed together adjacent their periphery to form a flat stock of brazing material. The washers of the chain have their adjacent peripheral portions overlapping, that is to say the portions merge into one another so as to form the overlap area. A pair of opposed notches are formed in the chain, one notch at each side of the chain and between the washers, and these notches extend into the overlap area of the washers. Thus, the notches define an interconnecting portion between the washers, and the periphery of the adjacent washers merge into one another within the interconnecting portion. The washers can be separated from one another by cutting through the interconnecting portion between the notches, and, more particularly, by cutting through the overlap area of the washer periphery. By providing a zone of cut in the overlap area of the washer, a certain tolerance is provided for the cut between the washers and without leaving a protrusion beyond the periphery of the washers.

A flat brazing washer chain is thereby provided which has a zone of cut between the washers that permits a variation in exact cutting position between the washers and still insures that no protrusions extend beyond the periphery of the washer which would otherwise prevent the washer from being positively, quickly and accurately positioned in a correspondingly shaped workpiece.

BRIEF DESCRIPTION OF THE DRAWINGS

FIG. 1 is a perspective view showing an apparatus feeding a brazing chain made in accordance with the present invention;

FIG. 2 is an enlarged perspective view of a workpiece and a finished brazing washer for said workpiece;

FIG. 3 is an enlarged perspective view of a portion of the chain shown in FIG. 1;

FIG. 4 is a fragmentary enlarged view of the chain and showing portions of adjacent washers; and FIG. 5 is an enlarged view of a portion of a finished washer.

DESCRIPTION OF THE PREFERRED EMBODIMENT

The apparatus shown in FIG. 1 includes a feeding portion 10 which has a pilot 11 that extends into the aperture 12 of a washer W of the washer chain C. The feeding portion 10 is shifted to the left, as viewed in FIG. 1, thereby advancing the chain C the length of one washer. A vacuum pickup nozzle 13 is vertically reciprocal by the drive means 14 on the carriage 15. The rear edge 16 of the nozzle acts in cooperation with a knife 17 driven by an air cylinder 18 so as to sever a washer from the chain. The nozzle then picks up the severed washer and the carriage 15 shifts to the left so that the nozzle assumes the position shown in the broken lines directly above the workpiece 20.

The workpiece 20 has a round hole 21, for example, into which the severed washer must be quickly and accurately placed. If the washer is misshapen, bent, or has a protrusion extending from its periphery, it will not enter the hole 21.

It is therefore important to precisely form the washer so that accurate and positive feeding of the washers into the workpieces takes place in a rapid and foolproof manner.

In accordance with the present invention, a brazing washer chain is formed with peripheral portions 23 and 24 of adjacent washers (FIG. 4) formed in overlapping manner, that is to say the washers have been formed in the flat stock of brazing material so that the peripheral portions of adjacent washers are merged together to form an overlap area. The washer chain has also been formed with a pair of opposed notches 26 and 27, one at each side of the chain, so that the notches extend into the said overlap area of the peripheral portions. In this manner the opposed notches 26 and 27 define therebetween an interconnecting portion 29 between adjacent washers. Thus, it will be noted, the periphery of adjacent washers merge into one another within the said interconnecting portions.

It will be noted by the reference numeral 30 and the opposed arrows connected therewith, that an overlapping area which coincides with part of interconnecting portion 29 defines a cutting zone within which the cut-off knife is permitted to operate in a longitudinal direction relative to the chain. In other words, there is a certain amount of play provided in which the knife can operate and still sever a washer so that no part of the washer protrudes beyond its periphery. The finished washer is shown in FIG. 5, and it will be seen that the periphery 32 of the washer extending around the cut-out portion clearly embraces what remains of the interconnecting portion of the washer.

The spaces 34 and 35 formed in the periphery of the washer are filled in with the brazing material when the brazing operation occurs, thereby forming a good joint.

As shown in FIG. 2, the finished washer has no projections extending from its periphery and can readily drop into the complementary-shaped aperture 21 of the workpiece.

I claim:

1. A flat brazing washer chain comprising a plurality of flat washers integrally formed from a flat stock of brazing material and joined together adjacent their peripheries, each adjacent pair of said washers having adjacent peripheral portions which, if projected, would merge together to define an overlap area, a series of pairs of opposed notches formed in said chain, one notch of each pair being formed in one side of said chain, each of said notches extending into said overlap area, each pair of opposed notches defining therebetween an interconnecting portion between adjacent washers, which interconnecting portion extends through an overlap area to define a cutting zone wherein the overlap area and interconnecting portion coincide, whereby said washers are separable by cutting said interconnecting portion within said cutting zone to thereby prevent any protrusion of a washer beyond its projected periphery.

2. The chain set forth in claim 1 further characterized in that each of said notches has a flat inner end, which end lies within said overlap area.

* * * * *